(12) United States Patent
Pacelli et al.

(10) Patent No.: US 10,648,357 B2
(45) Date of Patent: May 12, 2020

(54) PNEUMATIC TRIP VALVE PARTIAL STROKING ARRANGEMENT

(71) Applicant: Elliott Company, Jeannette, PA (US)

(72) Inventors: William G. Pacelli, Jeannette, PA (US); James F. Walsh, Monroeville, PA (US)

(73) Assignee: Elliott Company, Jeannette, PA (US)

( * ) Notice: Subject to any disclaimer, the term of this patent is extended or adjusted under 35 U.S.C. 154(b) by 685 days.

(21) Appl. No.: 15/272,871

(22) Filed: Sep. 22, 2016

(65) Prior Publication Data

US 2017/0096908 A1    Apr. 6, 2017

Related U.S. Application Data

(60) Provisional application No. 62/236,481, filed on Oct. 2, 2015.

(51) Int. Cl.
*F16K 31/122* (2006.01)
*F16K 37/00* (2006.01)
(Continued)

(52) U.S. Cl.
CPC ........... *F01D 17/145* (2013.01); *F01D 25/24* (2013.01); *F15B 11/10* (2013.01); *F15B 19/005* (2013.01); *F15B 20/008* (2013.01); *F16K 1/126* (2013.01); *F16K 31/1221* (2013.01); *F16K 31/406* (2013.01); *F16K 37/0083* (2013.01);
(Continued)

(58) Field of Classification Search
CPC ........ F01D 17/145; F01D 25/24; F01D 17/10; F01D 19/00; F01D 21/02; F01D 21/16; F15B 20/008; F15B 11/10; F15B 19/005; F15B 2211/8855; F15B 2211/87; F15B 2211/6336; F15B 2211/8755; F16K 37/0083; F16K 31/1221; F16K 31/406; F16K 1/126; F05D 2260/57; F05D 2220/31; F05D 2260/83
See application file for complete search history.

(56) References Cited

U.S. PATENT DOCUMENTS 3,682,564 A    8/1972  Feeney
3,987,818 A   10/1976  Williams
(Continued)

FOREIGN PATENT DOCUMENTS

CN    2167192 Y    6/1994
EP    2484590 A2   8/2012
(Continued)

*Primary Examiner* — Marina A Tietjen
(74) *Attorney, Agent, or Firm* — The Webb Law Firm (57) ABSTRACT

A pneumatic trip system for a turbine includes a valve member; a valve stem connected to the valve member; and an actuator assembly connected to the valve stem. The actuator assembly includes a cylinder; a piston connected to the valve stem, the piston dividing the cylinder into a first chamber and a second chamber; a biasing element disposed in the second chamber of the cylinder; and a pneumatic circuit in communication with the second chamber of the cylinder. The pneumatic circuit is configured to pressurize the second chamber of the cylinder to actuate the piston to move the valve stem and the valve member to an exercised position between the open position and the closed position while the first chamber is pressurized.

18 Claims, 6 Drawing Sheets

(51) Int. Cl.

| | | |
|---|---|---|
| F01D 17/14 | (2006.01) | |
| F15B 19/00 | (2006.01) | |
| F15B 20/00 | (2006.01) | |
| F15B 11/10 | (2006.01) | |
| F01D 17/10 | (2006.01) | |
| F01D 21/16 | (2006.01) | |
| F01D 25/24 | (2006.01) | |
| F16K 1/12 | (2006.01) | |
| F16K 31/40 | (2006.01) | |

(52) U.S. Cl.
CPC ...... F05D 2220/31 (2013.01); F05D 2260/57 (2013.01); F05D 2260/83 (2013.01); F15B 2211/6336 (2013.01); F15B 2211/87 (2013.01); F15B 2211/8755 (2013.01); F15B 2211/8855 (2013.01)

(56) References Cited

U.S. PATENT DOCUMENTS

| | | |
|---|---|---|
| 4,040,600 A | 8/1977 | Coppola et al. |
| 4,335,744 A | 6/1982 | Bey |
| 4,379,544 A | 4/1983 | Angelo et al. |
| 4,500,066 A | 2/1985 | Trassl |
| 4,679,769 A | 7/1987 | Dawawala et al. |
| 4,840,057 A | 6/1989 | Bingham |
| 6,082,393 A | 7/2000 | Tye |
| 6,435,022 B1 | 8/2002 | Albuaijan |
| 6,631,882 B2 | 10/2003 | Mack |
| 6,935,610 B1 | 8/2005 | Debruyne |
| 7,322,788 B2 | 1/2008 | Shindo et al. |
| 7,584,643 B2 | 9/2009 | Hoffman |
| 8,051,812 B2 | 11/2011 | Lou |
| 8,413,499 B2 | 4/2013 | Welker et al. |
| 8,996,328 B2 | 3/2015 | Snowbarger |
| 9,057,450 B2 | 6/2015 | Shurina et al. |
| 2007/0138420 A1 | 6/2007 | Shindo et al. |
| 2009/0222233 A1 | 9/2009 | Al-Buaijan |
| 2011/0072821 A1 | 3/2011 | Potten et al. |
| 2011/0315904 A1 | 12/2011 | Karte |
| 2012/0024390 A1* | 2/2012 | Dopslaff .............. B01J 47/14 137/1 |
| 2012/0199211 A1 | 8/2012 | Schroder et al. |
| 2014/0060684 A1 | 3/2014 | Tauber et al. |

FOREIGN PATENT DOCUMENTS

| | | |
|---|---|---|
| EP | 2620655 A1 | 7/2013 |
| JP | 571313 A | 3/1993 |
| JP | 200196371 A | 4/2001 |
| JP | 2003056306 A | 2/2003 |
| JP | 3680012 B2 | 8/2005 |
| JP | 2008138716 A | 6/2008 |
| RU | 2439339 C2 | 1/2012 |

* cited by examiner

PNEUMATIC TRIP VALVE PARTIAL STROKING ARRANGEMENT

CROSS REFERENCE TO RELATED APPLICATIONS

The present application claims priority from U.S. Provisional Patent Application No. 62/236,481, filed on Oct. 2, 2015, which is incorporated herein by reference in its entirety.

BACKGROUND OF THE INVENTION

Field of the Invention

The present invention relates generally to a pneumatic trip system for a steam turbine and, in particular, to a pneumatic trip system that includes an actuator assembly that exercises the trip valve via a pneumatic circuit without requiring a shutdown of the steam turbine.

Description of Related Art

A trip valve for a steam turbine is a safety device that must close quickly to shut off a flow of steam to the turbine during an emergency situation. Turbines typically run for long periods of time without shutting down, so the trip valve will typically remain in an open position for an extended period of time. When the trip valve remains in the open position for an extended period of time, scale and corrosion often build up between the valve stem and bushings in the steam chest trip valve assembly. This scale and corrosion may bind up the trip valve and prevent proper operation during an emergency situation.

Pneumatic trip systems provide a vital safety function for steam turbines. Proper maintenance and testing are necessary to ensure safe and reliable equipment operation. However, many mechanical trip systems are not tested as frequently as recommended, if at all.

Typically, trip valves require a complete closure, i.e., a complete valve actuation between open and closed positions, to determine if the trip valve is operational. This complete closure requires the turbine and driven equipment to be completely shut down, thereby disrupting the operation of the steam turbine. An available RCS (Redundant Control System) provides a means to exercise solenoid valves, but the RCS does not exercise a trip valve.

SUMMARY OF THE INVENTION

Generally, provided is an arrangement and method for preventing a trip valve from binding up without requiring the trip valve to be closed and affecting the operation of the turbine. The arrangement and method prevent scale and corrosion from binding up the trip valve.

According to one embodiment or aspect of the present disclosure, an arrangement and method for exercising a trip valve on a routine basis by moving the trip valve slightly to prevent scale and corrosion from developing between the trip valve and bushings are provided. The process of exercising the trip valve on a routine basis also provides an indication that the trip valve is operational. Conversely, if the trip valve becomes bound up or otherwise non-operational, the arrangement and method allows for identification of the situation so that a repair can be made to the trip valve before an emergency situation occurs.

The arrangement and method provide a fail-safe process of exercising the trip valve without interfering with the primary operation of the trip valve system. The arrangement will continue to actuate and close the trip valve during a secondary operation of exercising the trip valve. The arrangement includes an electrically actuated pneumatic system, which provides consistent reliability. The arrangement is cost-effective and compliant with the environmental and approval requirements of the current Pneumatic Overspeed Trip System.

According to another embodiment or aspect of the present disclosure, a pneumatic trip system with partial stroke actuation is provided. The system may be utilized with new equipment or provided as a retrofit. The system provides a safe and effective way to exercise the trip valve regularly, without interfering with the turbine's operation or its ability to trip. Within seconds, the system completes a partial stroke of the trip valve, enabling operators to determine if the system is working properly or requires attention. The system improves the reliability of the turbine and ensures that the trip valve is functioning properly. Turbine operators can initiate the partial stroke locally or remotely via a distributed control system (DCS). The system is supplied with standard hardware that is suitable for either application, providing flexibility to adapt the partial stroke system to any equipment configuration. The system offers increased safety, improved reliability, minimal impact on turbine maintenance, is durable, and is cost-effective. The system can be operated independent of the Pneumatic Overspeed Trip System.

In accordance with one preferred and non-limiting embodiment or aspect of the present disclosure, a pneumatic trip system for a turbine is provided. The system includes a valve member operatively associated with a turbine flow path, the valve member being configured to be actuated to engage the turbine flow path to close the flow path and prevent fluid flow through the turbine flow path; a valve stem connected to the valve member, the valve stem being configured to move the valve member between an open position allowing fluid flow through the turbine flow path and a closed position preventing fluid flow through the turbine flow path; and an actuator assembly operatively connected to the valve stem. The actuator assembly includes a cylinder; a piston operatively connected to the valve stem, the piston being movably disposed within the cylinder and dividing the cylinder into a first chamber and a second chamber; a biasing element disposed in the second chamber of the cylinder, the biasing element engaging the piston to bias the valve stem and the valve member toward the closed position; and a pneumatic circuit in communication with the second chamber of the cylinder. The cylinder includes a first port for placing the first chamber in communication with an exterior of the cylinder such that the first chamber of the cylinder can be pressurized to cause the piston to hold the valve stem and the valve member in the open position. The cylinder includes a second port for placing the second chamber in communication with the pneumatic circuit. The pneumatic circuit is configured to pressurize the second chamber of the cylinder to actuate the piston to move the valve stem and the valve member to an exercised position between the open position and the closed position while the first chamber is pressurized, the valve member allowing fluid flow through the turbine flow path in the exercised position.

According to another preferred and non-limiting embodiment or aspect of the present disclosure, an actuator assembly for a pneumatic trip system is provided. The actuator assembly includes a cylinder; a piston configured to be connected to a trip valve, the piston being movably disposed within the cylinder between a first position corresponding to an open position of the trip valve and a second position corresponding to a closed position of the trip valve, and the piston dividing the cylinder into a first chamber and a second chamber; a biasing element disposed in the second chamber of the cylinder, the biasing element engaging the piston to bias piston toward the second position; and a pneumatic circuit in communication with the second chamber of the cylinder. The cylinder includes a first port for placing the first chamber in communication with an exterior of the cylinder such that the first chamber of the cylinder can be pressurized to cause the piston to remain in the first position. The cylinder includes a second port for placing the second chamber in communication with the pneumatic circuit. The pneumatic circuit is configured to pressurize the second chamber of the cylinder to actuate the piston to move to an intermediate position between the first position and the second position corresponding to an exercised position of the trip valve while the first chamber is pressurized.

According to another preferred and non-limiting embodiment or aspect of the present disclosure, a method for exercising a trip valve of a pneumatic trip system for a turbine is provided. The trip valve includes a valve member operatively associated with a turbine flow path and a valve stem connected to the valve member. The valve member is configured to be actuated to engage the turbine flow path to close the flow path and prevent fluid flow through the turbine flow path. The method includes providing an actuator assembly operatively connected to the valve stem. The actuator assembly includes a cylinder; a piston movably disposed within the cylinder and dividing the cylinder into a first chamber and a second chamber; a biasing element disposed in the second chamber of the cylinder, the biasing element engaging the piston; and a pneumatic circuit in communication with the second chamber of the cylinder. The piston is operatively connected to the valve stem to move the valve stem and the valve member between an open position allowing fluid flow through the turbine flow path and a closed position preventing fluid flow through the turbine flow path. The biasing element engages the piston to bias the valve stem and the valve member toward the closed position. The cylinder includes a first port for placing the first chamber in communication with an exterior of the cylinder such that the first chamber of the cylinder can be pressurized to cause the piston to hold the valve stem and the valve member in the open position. The cylinder includes a second port for placing the second chamber in communication with the pneumatic circuit. The method further includes activating the pneumatic circuit to pressurize the second chamber of the cylinder to actuate the piston to move the valve stem and the valve member to an exercised position between the open position and the closed position while the first chamber is pressurized; activating the pneumatic circuit to stop pressurizing the second chamber when the valve stem and the valve member reach the exercised position and retain pressure in the second chamber to hold the valve stem and the valve member in the exercised position; and deactivating the pneumatic circuit to release the pressure from the second chamber and allow the valve stem and the valve member to return to the open position. The valve member allows fluid flow through the turbine flow path in the exercised position.

Further preferred and non-limiting embodiment or aspects will now be described in the following number clauses.

Clause 1: A pneumatic trip system for a turbine, comprising: a valve member operatively associated with a turbine flow path, the valve member being configured to be actuated to engage the turbine flow path to close the flow path and prevent fluid flow through the turbine flow path; a valve stem connected to the valve member, the valve stem being configured to move the valve member between an open position allowing fluid flow through the turbine flow path and a closed position preventing fluid flow through the turbine flow path; and an actuator assembly operatively connected to the valve stem, the actuator assembly comprising: a cylinder; a piston operatively connected to the valve stem, the piston being movably disposed within the cylinder and dividing the cylinder into a first chamber and a second chamber; a biasing element disposed in the second chamber of the cylinder, the biasing element engaging the piston to bias the valve stem and the valve member toward the closed position; and a pneumatic circuit in communication with the second chamber of the cylinder, wherein the cylinder includes a first port for placing the first chamber in communication with an exterior of the cylinder such that the first chamber of the cylinder can be pressurized to cause the piston to hold the valve stem and the valve member in the open position, wherein the cylinder includes a second port for placing the second chamber in communication with the pneumatic circuit, and wherein the pneumatic circuit is configured to pressurize the second chamber of the cylinder to actuate the piston to move the valve stem and the valve member to an exercised position between the open position and the closed position while the first chamber is pressurized, the valve member allowing fluid flow through the turbine flow path in the exercised position.

Clause 2: The pneumatic trip system according to clause 1, further comprising a pneumatic mechanism configured to pressurize the first chamber of the cylinder to cause the piston to hold the valve stem and the valve member in the open position and to release pressure from the first chamber of the cylinder to allow the piston to move the valve stem and the valve member to the closed position under the bias of the biasing element.

Clause 3: The pneumatic trip system according to clause 1 or clause 2, wherein the pneumatic circuit is configured to stop pressurizing the second chamber when the valve stem and the valve member reach the exercised position and retain pressure in the second chamber to hold the valve stem and the valve member in the exercised position.

Clause 4: The pneumatic trip system according to clause 3, wherein the pneumatic circuit comprises a limit switch actuated by the piston when the piston moves the valve stem and the valve member to the exercised position, and wherein the limit switch is configured to cause the pneumatic circuit to stop pressurizing the second chamber and to retain the pressure in the second chamber when actuated by the piston.

Clause 5: The pneumatic trip system according to clause 3 or clause 4, wherein the pneumatic circuit comprises a first solenoid and a second solenoid, wherein the first solenoid and the second solenoid are actuated to pressurize the second chamber of the cylinder when the pneumatic circuit is activated, wherein the first solenoid and the second solenoid are actuated to stop pressurizing the second chamber and retain the pressure in the second chamber when the valve stem and the valve member are in the exercised position, and wherein the first solenoid and the second solenoid are actuated to release the pressure from the second chamber when the pneumatic circuit is deactivated.

Clause 6: The pneumatic trip system according to any one of clauses 1-5, wherein the pneumatic circuit comprises an activation switch configured to activate the pneumatic circuit to pressurize the second chamber of the cylinder and to deactivate the pneumatic circuit to release pressure from the second chamber.

Clause 7: The pneumatic trip system according to clause 6, wherein the activation switch is operatively connected to a rotary switch.

Clause 8: The pneumatic trip system according to any one of clauses 1-7, wherein the biasing element comprises a compression spring.

Clause 9: An actuator assembly for a pneumatic trip system, the actuator assembly comprising: a cylinder; a piston configured to be connected to a trip valve, the piston being movably disposed within the cylinder between a first position corresponding to an open position of the trip valve and a second position corresponding to a closed position of the trip valve, and the piston dividing the cylinder into a first chamber and a second chamber; a biasing element disposed in the second chamber of the cylinder, the biasing element engaging the piston to bias piston toward the second position; and a pneumatic circuit in communication with the second chamber of the cylinder, wherein the cylinder includes a first port for placing the first chamber in communication with an exterior of the cylinder such that the first chamber of the cylinder can be pressurized to cause the piston to remain in the first position, wherein the cylinder includes a second port for placing the second chamber in communication with the pneumatic circuit, and wherein the pneumatic circuit is configured to pressurize the second chamber of the cylinder to actuate the piston to move to an intermediate position between the first position and the second position corresponding to an exercised position of the trip valve while the first chamber is pressurized.

Clause 10: The actuator assembly according to clause 9, wherein the pneumatic circuit is configured to stop pressurizing the second chamber when the piston reaches the intermediate position and retain pressure in the second chamber to hold the piston in the intermediate position.

Clause 11: The actuator assembly according to clause 10, wherein the pneumatic circuit comprises a limit switch actuated by the piston when the piston reaches the intermediate position, and wherein the limit switch is configured to cause the pneumatic circuit to stop pressurizing the second chamber and to retain the pressure in the second chamber when actuated by the piston.

Clause 12: The actuator assembly according to clause 10 or clause 11, wherein the pneumatic circuit comprises a first solenoid and a second solenoid, wherein the first solenoid and the second solenoid are actuated to pressurize the second chamber of the cylinder when the pneumatic circuit is activated, wherein the first solenoid and the second solenoid are actuated to stop pressurizing the second chamber and to retain the pressure in the second chamber when the piston reaches the intermediate position, and wherein the first solenoid and the second solenoid are actuated to release the pressure from the second chamber when the pneumatic circuit is deactivated.

Clause 13: The actuator assembly according to any one of clauses 9-12, wherein the pneumatic circuit comprises an activation switch configured to activate the pneumatic circuit to pressurize the second chamber of the cylinder and to deactivate the pneumatic circuit to release pressure from the second chamber.

Clause 14: The actuator assembly according to clause 13, wherein the activation switch is operatively connected to a rotary switch.

Clause 15: The actuator assembly according to any one of clauses 9-14, wherein the biasing element comprises a compression spring.

Clause 16: A method for exercising a trip valve of a pneumatic trip system for a turbine, wherein the trip valve comprises a valve member operatively associated with a turbine flow path and a valve stem connected to the valve member, and wherein the valve member is configured to be actuated to engage the turbine flow path to close the flow path and prevent fluid flow through the turbine flow path, the method comprising: providing an actuator assembly operatively connected to the valve stem, the actuator assembly comprising: a cylinder; a piston movably disposed within the cylinder and dividing the cylinder into a first chamber and a second chamber; a biasing element disposed in the second chamber of the cylinder, the biasing element engaging the piston; and a pneumatic circuit in communication with the second chamber of the cylinder, wherein the piston is operatively connected to the valve stem to move the valve stem and the valve member between an open position allowing fluid flow through the turbine flow path and a closed position preventing fluid flow through the turbine flow path, wherein the biasing element engages the piston to bias the valve stem and the valve member toward the closed position, wherein the cylinder includes a first port for placing the first chamber in communication with an exterior of the cylinder such that the first chamber of the cylinder can be pressurized to cause the piston to hold the valve stem and the valve member in the open position, and wherein the cylinder includes a second port for placing the second chamber in communication with the pneumatic circuit; activating the pneumatic circuit to pressurize the second chamber of the cylinder to actuate the piston to move the valve stem and the valve member to an exercised position between the open position and the closed position while the first chamber is pressurized; activating the pneumatic circuit to stop pressurizing the second chamber when the valve stem and the valve member reach the exercised position and retain pressure in the second chamber to hold the valve stem and the valve member in the exercised position; and deactivating the pneumatic circuit to release the pressure from the second chamber and allow the valve stem and the valve member to return to the open position, wherein the valve member allows fluid flow through the turbine flow path in the exercised position.

Clause 17: The method according to clause 16, further comprising: pressurizing the first chamber of the cylinder to cause the piston to hold the valve stem and the valve member in the open position; and releasing the pressure from the first chamber of the cylinder to allow the piston to move the valve stem and the valve member to the closed position under the bias of the biasing element.

Clause 18: The method according to clause 16 or clause 17, wherein the pneumatic circuit comprises a limit switch actuated by the piston when the piston moves the valve stem and the valve member to the exercised position, and wherein the limit switch is configured to activate the pneumatic circuit to stop pressurizing the second chamber and to retain the pressure in the second chamber when actuated by the piston.

Clause 19: The method according to any one of clauses 16-18, wherein the pneumatic circuit comprises a first solenoid and a second solenoid, wherein the first solenoid and the second solenoid are actuated to pressurize the second chamber of the cylinder when the pneumatic circuit is activated, wherein the first solenoid and the second solenoid are actuated to stop pressurizing the second chamber and retain the pressure in the second chamber when the valve stem and the valve member are in the exercised position, and wherein the first solenoid and the second solenoid are actuated to release the pressure from the second chamber when the pneumatic circuit is deactivated.

Clause 20: The method according to any one of clauses 16-19, wherein the pneumatic circuit comprises an activation switch configured to activate the pneumatic circuit to pressurize the second chamber of the cylinder and to deactivate the pneumatic circuit to release the pressure from the second chamber.

These and other features and characteristics of the present invention, as well as the methods of operation and functions of the related elements of structures, and the combination of parts and economies of manufacture will become more apparent upon consideration of the following description and with reference to the accompanying drawings, all of which form a part of this specification, wherein like reference numerals designate corresponding parts in the various figures. It is to be expressly understood, however, that the drawings are for the purpose of illustration and description only, and are not intended as a definition of the limits of the invention. As used in the specification and the claims, the singular form of "a", "an", and "the" include plural referents unless the context clearly dictates otherwise.

DETAILED DESCRIPTION OF THE INVENTION

For purposes of the description hereinafter, the terms "end", "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

With reference to FIGS. 1-6C, a pneumatic trip system 10 for partially actuating a steam chest trip valve 11 of a steam turbine 100 is shown in accordance with a preferred and non-limiting embodiment or aspect of the present disclosure. The pneumatic trip system 10 includes the trip valve 11, which is made up of a valve member 12 operatively associated with a flow path 101 forming part of the steam turbine 100 and a valve stem 13 connected to the valve member 12.

Figure 1:
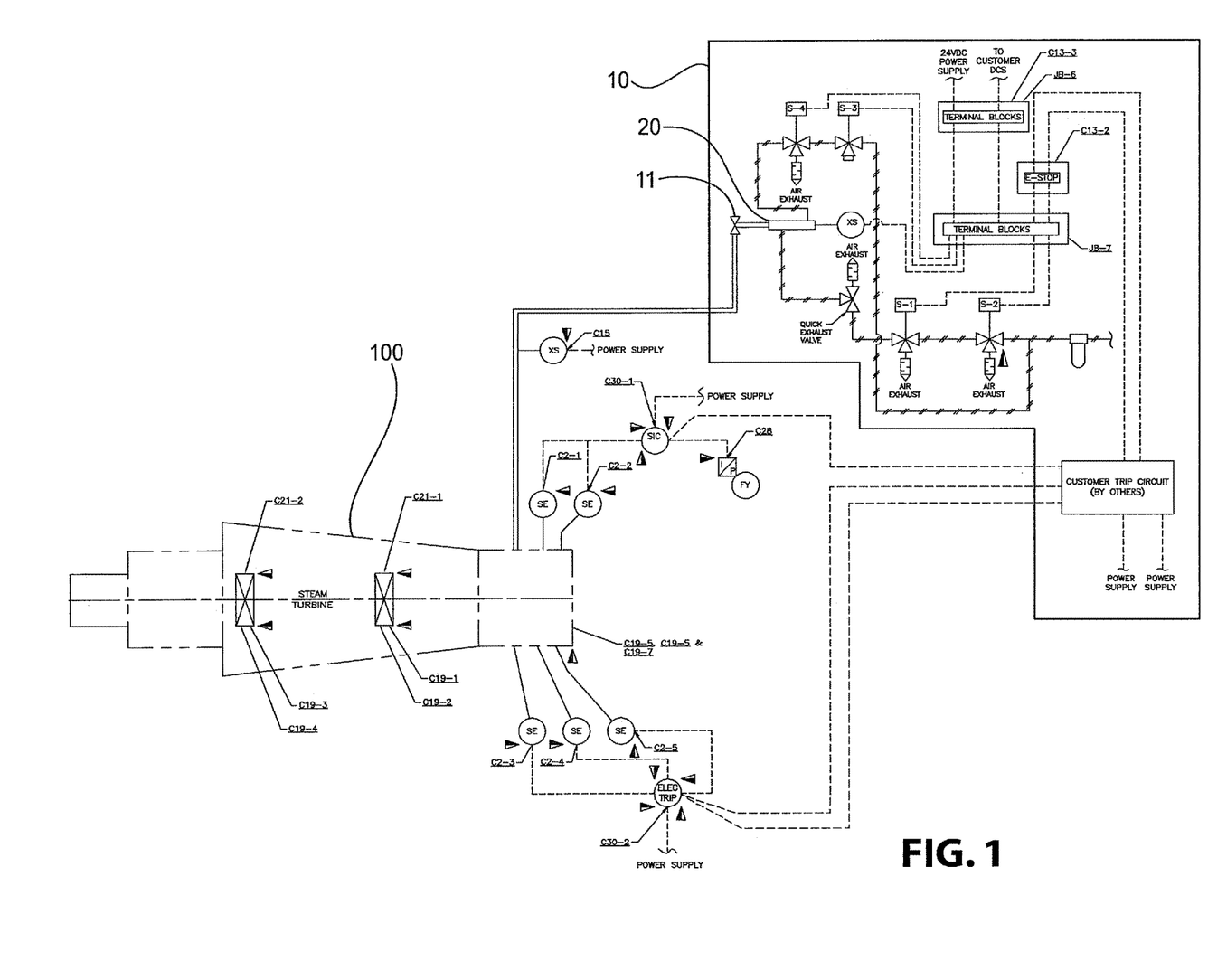
FIG. 1 is an electro-pneumatic schematic of a steam turbine incorporating a pneumatic trip system in accordance with a non-limiting embodiment or aspect of the present disclosure.
Figure 2:
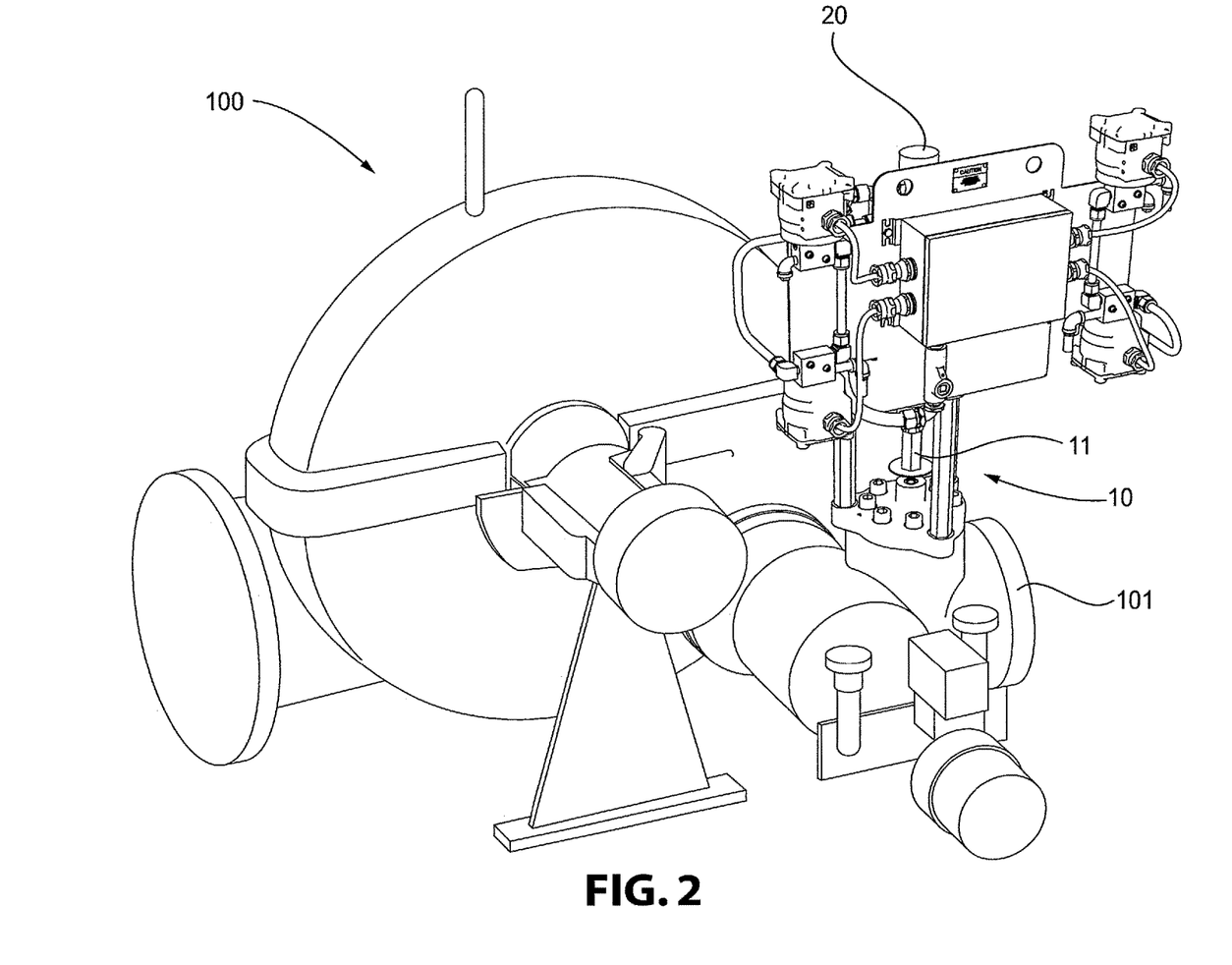
FIG. 2 is a perspective view of the steam turbine and pneumatic trip system.
Figure 3:
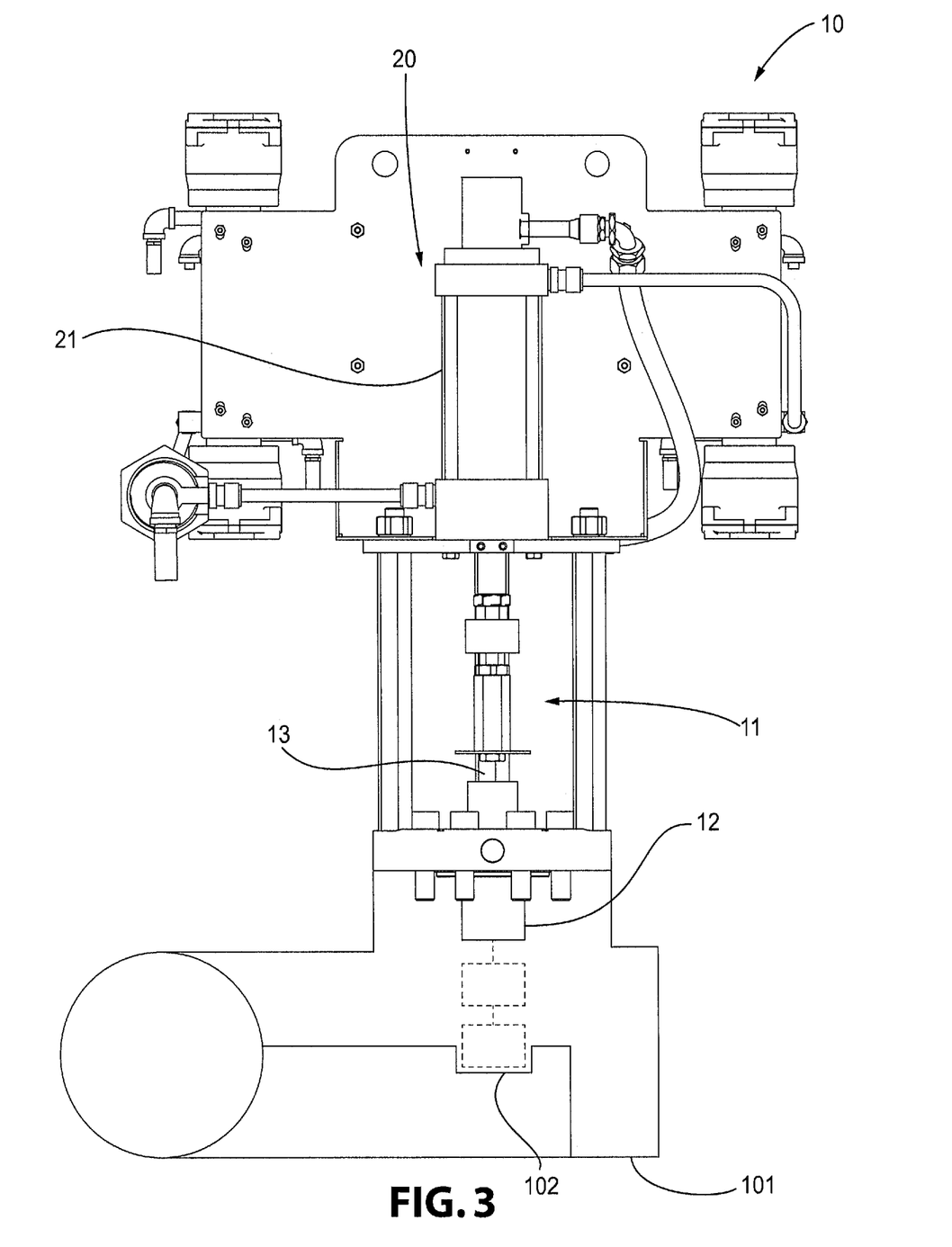
FIG. 3 is a rear view of the pneumatic trip system of FIG. 2 in association with a flow path of the steam turbine.

As shown in FIG. 3, the valve member 12 is actuated to be movable within the turbine flow path 101 to engage a valve seat 102 in the flow path 101 to close the flow path 101 and prevent fluid flow through the flow path 101. The valve stem 13 moves the valve member 12 between an open position allowing fluid flow through the turbine flow path 101 and a closed position, in which the valve member 12 engages the valve seat 102, preventing fluid flow through the flow path 101.

Figure 4:
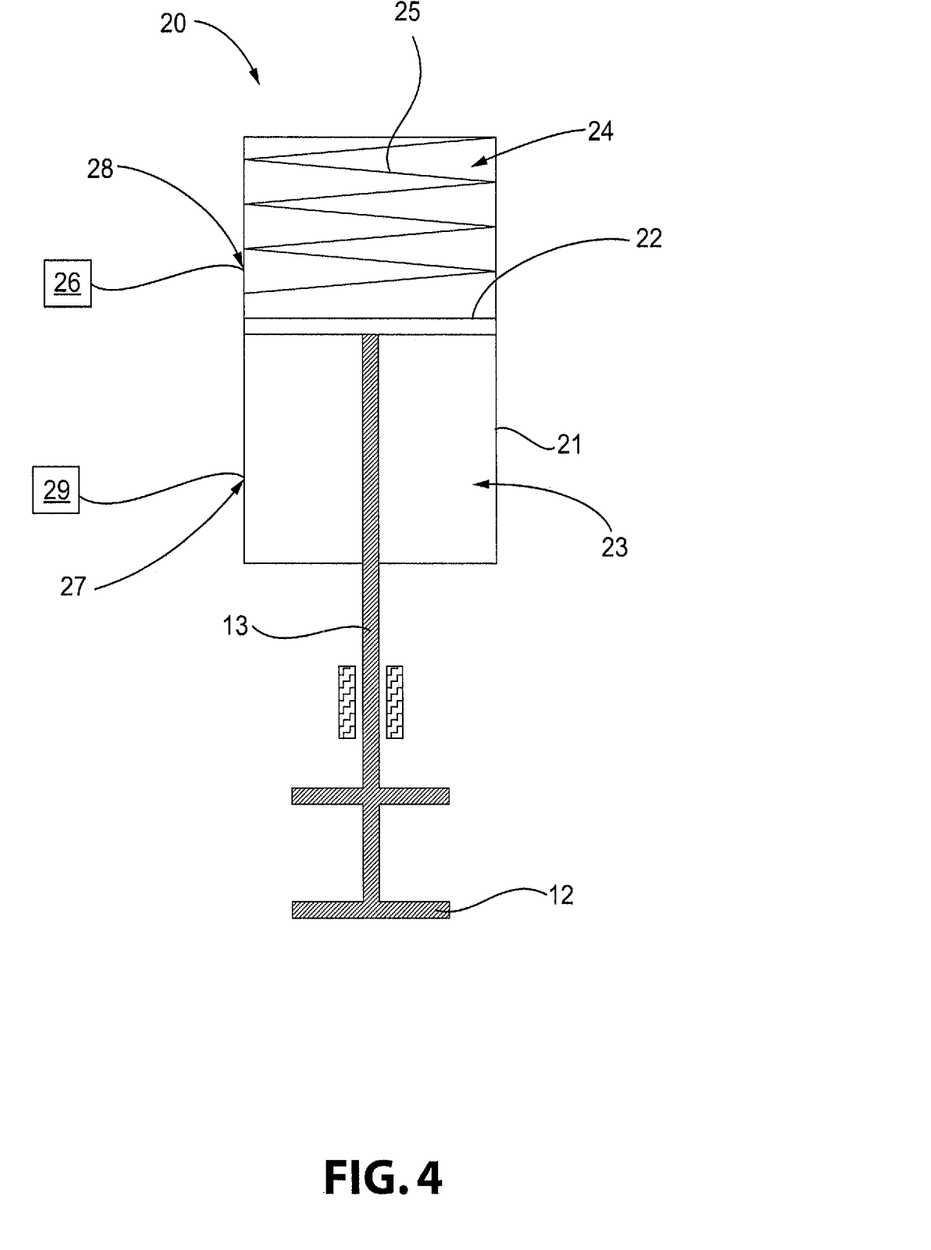
FIG. 4 is a schematic illustrating an actuator assembly of the pneumatic trip system of FIG. 3.

With reference to FIGS. 1-6C, the pneumatic trip system 10 also includes an actuator assembly 20 operatively connected to the valve stem 13 of the trip valve 11. As shown in FIGS. 4-6C, the actuator assembly 20 includes a cylinder 21 and a piston 22 operatively connected to the valve stem 13. The piston 22 is movably disposed within the cylinder 21 and divides the cylinder 21 into a first chamber 23 defined below the piston 22 and a second chamber 24 defined above the piston 22. The piston 22 is movable within the cylinder 21 between a first position corresponding to the open position of the trip valve 11 and a second position corresponding to the closed position of the trip valve 11. The valve stem 13 may extend into the cylinder 21 to engage the bottom of the piston 22. The actuator assembly 20 also includes a biasing element 25 disposed in the second chamber 24 of the cylinder 21. The biasing element 25 engages the piston 22 to bias the piston 22 toward the second position and thereby bias the valve stem 13 and the valve member 12 toward the closed position. The actuator assembly 20 further includes a pneumatic circuit 26 in communication with the second chamber 24. As shown in FIG. 4, the biasing element 25 is a compression spring. However it is to be appreciated that the biasing element may be of any type of structure or configuration suitable for being incorporated within the actuator assembly 20 and sufficiently resilient to force the valve member 12 into the closed position when the trip valve 11 is actuated.

As shown in FIGS. 4 and 6A-6C, the cylinder 21 includes a first port 27 defined in a lower portion of the cylinder 21 for placing the first chamber 23 in communication with an exterior of the cylinder 21 such that the first chamber 23 can be pressurized to cause the piston 22 to remain in the first position and thereby hold the valve stem 13 and the valve member 12 in the open position. The cylinder 21 also includes a second port 28 defined in an upper portion of the cylinder 21 for placing the second chamber 24 in communication with the pneumatic circuit 26. The pneumatic circuit 26 pressurizes the second chamber 24 to, in combination with the biasing element 25, actuate the piston 22 to move to an intermediate position, shown in FIG. 3, between the first position and the second position corresponding to an exercised position of the trip valve 11 while the first chamber 23 is pressurized. The piston 22 thereby moves the valve stem 13 and the valve member 12 to an exercised position between the open position and the closed position while the first chamber 23 is pressurized. The valve member 12 allows fluid flow through the turbine flow path 101 in the exercised position.

As shown in FIG. 4, the pneumatic trip system 10 also includes a pneumatic mechanism 29 that pressurizes the first chamber 23 of the cylinder 21 to cause the piston 22 to hold the valve stem 13 and the valve member 12 in the open position and to release pressure from the first chamber 23 to allow the piston 22 to move the valve stem 13 and the valve member 12 to the closed position under the bias of the biasing element 25. According to one particular preferred and non-limiting embodiment or aspect of the present disclosure, the pneumatic mechanism 29 is a Pneumatic Overspeed Trip System known to those having ordinary skill in the art and commonly used to trip the valve 11 to close the flow path 101 during an emergency shutdown of the steam turbine 100. It is to be appreciated that the pneumatic mechanism 29 may be of any type or configuration found to be suitable for holding the trip valve 11 in the open position, as discussed above. Accordingly, the pneumatic circuit 26 causes actuation of the trip valve 11 through a partial stroke without requiring a complete closure of the valve 11, thereby allowing continued operation of the steam turbine 100 with the safety mechanism of the Pneumatic Overspeed Trip System (pneumatic mechanism 29) in place and capable of actuating the trip valve 11 to close the flow path 101.

Figure 5:
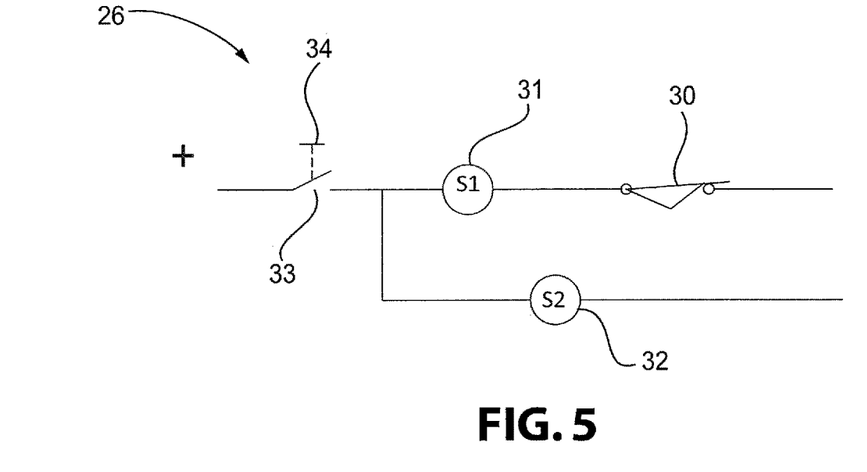
FIG. 5 is an electrical schematic of a pneumatic circuit of the actuator assembly of FIG. 4.

As shown in FIG. 5, the pneumatic circuit 26 includes an activation switch 33 operatively connected or coupled to a manual rotary switch 34. The activation switch 33 activates the pneumatic circuit 26 to pressurize the second chamber 24 of the cylinder 21 and initiate a partial trip of the valve 11 to exercise the valve 11. The activation switch 33 also deactivates the pneumatic circuit 26 to release pressure from the second chamber 24 after the trip valve 11 has been exercised to allow the valve stem 13 and the valve member 12 to return to the open position under the pressure applied to the first chamber 23 of the cylinder 21.

Figure 6A:
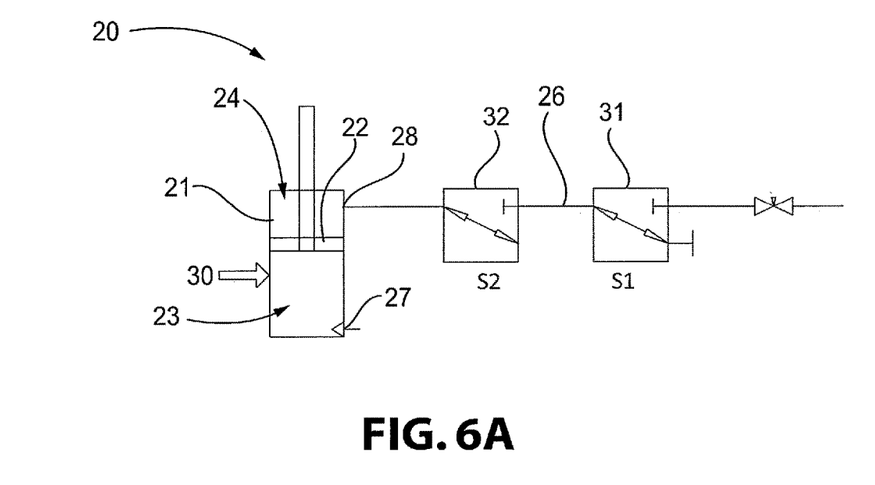
FIG. 6A is a pneumatic schematic of the actuator assembly of FIG. 4 in a first operational state.
Figure 6B:
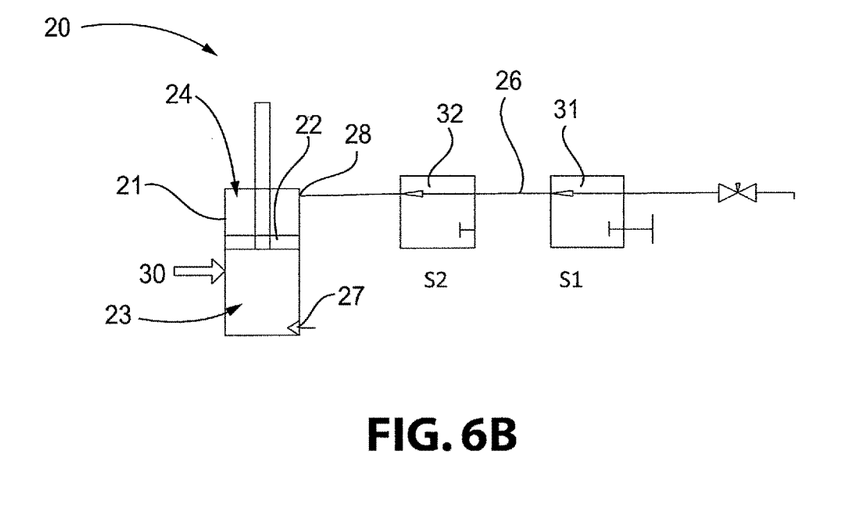
FIG. 6B is a pneumatic schematic of the actuator assembly of FIG. 4 in a second operational state.
Figure 6C:
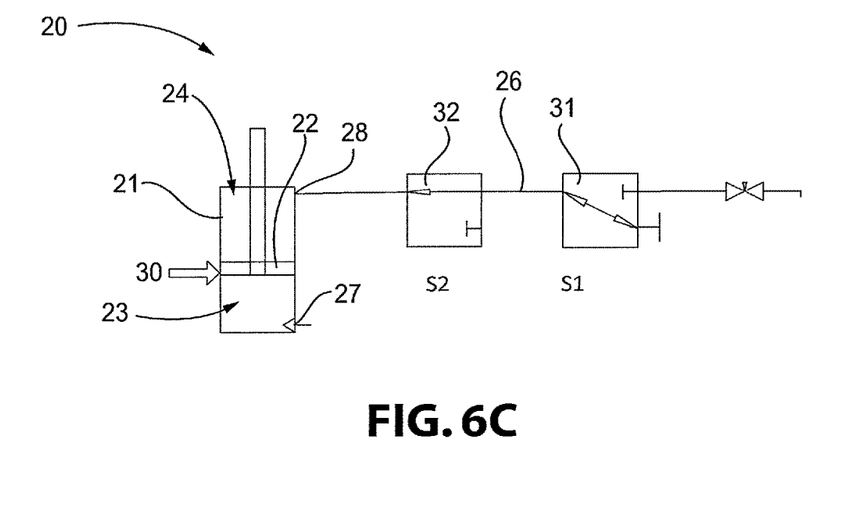
FIG. 6C is a pneumatic schematic of the actuator assembly of FIG. 4 in a third operational state.

With reference to FIGS. 5-6C, after the pneumatic circuit 26 is activated by the activation switch 33, the pneumatic circuit 26 is configured to stop pressurizing the second chamber 24 of the cylinder 21 when the piston 22 reaches the intermediate position and the valve stem 13 and the valve member 12 thereby reach the exercised position. The pneumatic circuit 26 will also retain pressure in the second chamber 24 to hold the piston 22 in the intermediate position and the valve stem 13 and the valve member 12 in the exercised position. In particular, pneumatic circuit 26 further includes a first solenoid 31 and a second solenoid 32. The first solenoid 31 is coupled to a limit switch 30 that is actuated by the piston 22 when the piston moves to the intermediate position and thereby moves the valve stem 13 and the valve member 12 to the exercised position.

As shown in FIG. 6A, in an initial operational state, the pneumatic circuit 26 is deactivated and both the first and second solenoids 31, 32 are actuated to close off any pressurization of the second chamber 24 of the cylinder 21. As shown in FIG. 6B, when the pneumatic circuit 26 is activated by actuation of the activation switch 33 via actuation of the rotary switch 34, a partial stroke of the trip valve 11 is initiated by actuating the first solenoid 31 and the second solenoid 32 to slowly pressurize the second chamber 24 of the cylinder 21. As the second chamber 24 is pressurized, the piston 22 is forced downwardly against the pressure in the first chamber 23 to move piston 22 away from the first position and thereby move the valve stem 13 and the valve member 12 away from the open position.

As shown in FIG. 6C, as the piston 22 moves downwardly within the cylinder 21, the piston 22 actuates the limit switch 30 to open when the piston 22 reaches the intermediate position and the valve stem 13 and the valve member 12 thereby reach the exercised position. This, in turn, actuates the first solenoid 31 and the second solenoid 32 to stop pressurizing the second chamber 24 and retain the pressure in the second chamber 24 to thereby hold the piston 22 in the intermediate position and the valve stem 13 and the valve member 12 in the exercised position. According to one particular and non-limiting embodiment or aspect of the present disclosure, the pneumatic circuit 26 causes the piston 22 and thereby the valve stem 13 and the valve member 12 to move a distance of approximately ⅜" from the first/open position to the intermediate/exercised position, though it is to be appreciated that the distance between the open position and the exercised position of the trip valve 11 may be set to any distance found to be suitable to those having ordinary skill in the art so long as the valve member 12 remains sufficiently distant from the valve seat 102 in the turbine flow path 101 to allow for free flow of fluid through the flow path 101. According to another particular and non-limiting embodiment or aspect of the present disclosure, the position of the limit switch 30 on the cylinder 21 is adjustable to thereby adjust the intermediate/exercised position.

When the rotary switch 34 is released by the operator, the activation switch 33 is opened and the pneumatic circuit 26 is deactivated. When the pneumatic circuit 26 is deactivated, the first solenoid 31 and the second solenoid 32 are actuated to release the pressure from the second chamber 24 of the cylinder 21 thereby allowing the valve stem 13 and the valve member 12 to return to the open position and the actuator assembly 20 to return to the normal operational state depicted in FIG. 6A. According to one particular embodiment or aspect of the present disclosure, the first and second solenoids 31, 32 leave the second chamber 24 of the cylinder 21 open to atmosphere when the pneumatic circuit 26 is deactivated.

With reference to FIGS. 1-6C, a method of exercising a trip valve 11 of a pneumatic trip system 10 for a steam turbine 100 is provided in accordance with a preferred and non-limiting embodiment or aspect of the invention. The trip valve 11 includes a valve member 12 operatively associated with a turbine flow path 101 and a valve stem 13 connected to the valve member 12. The valve member 12 is configured to be actuated to engage the turbine flow path 101 to close the flow path 101 and prevent fluid flow through the turbine flow path 101. The method includes providing an actuator assembly 20 operatively connected to the valve stem 13. The actuator assembly 20 includes a cylinder 21; a piston 22 movably disposed within the cylinder 21 and dividing the cylinder 21 into a first chamber 23 and a second chamber 24; a biasing element 25 disposed in the second chamber 24 of the cylinder 21, the biasing element 25 engaging the piston 22; and a pneumatic circuit 26 in communication with the second chamber 24 of the cylinder 21. The piston 22 is operatively connected to the valve stem 13 to move the valve stem 13 and the valve member 12 between an open position allowing fluid flow through the turbine flow path 101 and closed position preventing fluid flow through the turbine flow path 101. The biasing element 25 engages the piston 22 to bias the valve stem 13 and the valve member 12 toward the closed position. The cylinder 21 includes a first port 27 for placing the first chamber 23 in communication with an exterior of the cylinder 21 such that the first chamber 23 of the cylinder 21 can be pressurized to cause the piston 22 to hold the valve stem 13 and the valve member 12 in the open position. The cylinder 21 includes a second port 28 for placing the second chamber 24 in communication with the pneumatic circuit 26. The method further includes activating the pneumatic circuit 26 to pressurize the second chamber 24 of the cylinder 21 to actuate the piston 22 to move the valve stem 13 and the valve member 12 to an exercised position between the open position and the closed position while the first chamber 23 is pressurized; activating the pneumatic circuit 26 to stop pressurizing the second chamber 24 when the valve stem 13 and the valve member 12 reach the exercised position and retain pressure in the second chamber 24 to hold the valve stem 13 and the valve member 12 in the exercised position; and deactivating pneumatic circuit 26 to release the pressure from the second chamber 24 and allow the valve stem 13 and the valve member 12 to return to the open position. The valve member 12 allows fluid flow through the turbine flow path 101 in the exercised position.

The method may also include pressurizing the first chamber 23 of the cylinder 21 to cause the piston 22 to hold the valve stem 13 and the valve member 12 in the open position; and releasing the pressure from the first chamber 23 of the cylinder 21 to allow the piston 22 to move the valve stem 13 and the valve member 12 to the closed position under the bias of the biasing element 25.

It is to be understood that the invention may assume various alternative variations and step sequences, except where expressly specified to the contrary. It is also to be understood that the specific devices and processes illustrated in the attached drawings, and described in the specification, are simply exemplary embodiments or aspects of the invention. Although the invention has been described in detail for the purpose of illustration based on what is currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope thereof. For example, it is to be understood that the present invention contemplates that, to the extent possible, one or more features of any embodiment or aspect can be combined with one or more features of any other embodiment or aspect.

The invention claimed is:

1. A pneumatic trip system for a turbine, comprising:
a valve member operatively associated with a turbine flow path, the valve member being configured to be actuated to engage the turbine flow path to close the flow path and prevent fluid flow through the turbine flow path;
a valve stem connected to the valve member, the valve stem being configured to move the valve member between an open position allowing fluid flow through the turbine flow path and a closed position preventing fluid flow through the turbine flow path; and
an actuator assembly operatively connected to the valve stem, the actuator assembly comprising:
a cylinder;
a piston operatively connected to the valve stem, the piston being movably disposed within the cylinder and dividing the cylinder into a first chamber and a second chamber;
a biasing element disposed in the second chamber of the cylinder, the biasing element engaging the piston to bias the valve stem and the valve member toward the closed position;
a pneumatic circuit in communication with the second chamber of the cylinder; and
a pneumatic mechanism configured to pressurize the first chamber of the cylinder,
wherein the cylinder includes a first port for placing the first chamber in communication with an exterior of the cylinder such that the first chamber of the cylinder can be pressurized to cause the piston to hold the valve stem and the valve member in the open position, and
wherein the pneumatic mechanism is in communication with the first chamber of the cylinder via the first port and is configured to pressurize the first chamber to cause the piston to hold the valve stem and the valve member in the open position and to release pressure from the first chamber of the cylinder to allow the piston to move the valve stem and the valve member to the closed position under the bias of the biasing element,
wherein the cylinder includes a second port for placing the second chamber in communication with the pneumatic circuit, and
wherein the pneumatic circuit is configured to pressurize the second chamber of the cylinder to actuate the piston to move the valve stem and the valve member to an exercised position between the open position and the closed position while the first chamber is pressurized by the pneumatic mechanism, the valve member allowing fluid flow through the turbine flow path in the exercised position.

2. The pneumatic trip system according to claim 1, wherein the pneumatic circuit is configured to stop pressurizing the second chamber when the valve stem and the valve member reach the exercised position and retain pressure in the second chamber to hold the valve stem and the valve member in the exercised position.

3. The pneumatic trip system according to claim 2, wherein the pneumatic circuit comprises a limit switch actuated by the piston when the piston moves the valve stem and the valve member to the exercised position, and wherein the limit switch is configured to cause the pneumatic circuit to stop pressurizing the second chamber and to retain the pressure in the second chamber when actuated by the piston.

4. The pneumatic trip system according to claim 2, wherein the pneumatic circuit comprises a first solenoid and a second solenoid, wherein the first solenoid and the second solenoid are actuated to pressurize the second chamber of the cylinder when the pneumatic circuit is activated, wherein the first solenoid and the second solenoid are actuated to stop pressurizing the second chamber and retain the pressure in the second chamber when the valve stem and the valve member are in the exercised position, and wherein the first solenoid and the second solenoid are actuated to release the pressure from the second chamber when the pneumatic circuit is deactivated.

5. The pneumatic trip system according to claim 1, wherein the pneumatic circuit comprises an activation switch configured to activate the pneumatic circuit to pressurize the second chamber of the cylinder and to deactivate the pneumatic circuit to release pressure from the second chamber.

6. The pneumatic trip system according to claim 5, wherein the activation switch is operatively connected to a rotary switch.

7. The pneumatic trip system according to claim 1, wherein the biasing element comprises a compression spring.

8. An actuator assembly for a pneumatic trip system, the actuator assembly comprising:
a cylinder;
a piston configured to be connected to a trip valve, the piston being movably disposed within the cylinder between a first position corresponding to an open position of the trip valve and a second position corresponding to a closed position of the trip valve, and the piston dividing the cylinder into a first chamber and a second chamber;
a biasing element disposed in the second chamber of the cylinder, the biasing element engaging the piston to bias piston toward the second position;
a pneumatic circuit in communication with the second chamber of the cylinder; and a pneumatic mechanism configured to pressurize the first chamber of the cylinder, wherein the cylinder includes a first port for placing the first chamber in communication with an exterior of the cylinder such that the first chamber of the cylinder can be pressurized to cause the piston to remain in the first position, wherein the pneumatic mechanism is in communication with the first chamber of the cylinder via the first port and is configured to pressurize the first chamber to hold the piston in the first position and to release pressure from the first chamber of the cylinder to allow the piston to move to the second position under the bias of the biasing element, wherein the cylinder includes a second port for placing the second chamber in communication with the pneumatic circuit, and wherein the pneumatic circuit is configured to pressurize the second chamber of the cylinder to actuate the piston to move to an intermediate position between the first position and the second position corresponding to an exercised position of the trip valve while the first chamber is pressurized by the pneumatic mechanism.

9. The actuator assembly according to claim 8, wherein the pneumatic circuit is configured to stop pressurizing the second chamber when the piston reaches the intermediate position and retain pressure in the second chamber to hold the piston in the intermediate position.

10. The actuator assembly according to claim 9, wherein the pneumatic circuit comprises a limit switch actuated by the piston when the piston reaches the intermediate position, and wherein the limit switch is configured to cause the pneumatic circuit to stop pressurizing the second chamber and to retain the pressure in the second chamber when actuated by the piston.

11. The actuator assembly according to claim 9, wherein the pneumatic circuit comprises a first solenoid and a second solenoid, wherein the first solenoid and the second solenoid are actuated to pressurize the second chamber of the cylinder when the pneumatic circuit is activated, wherein the first solenoid and the second solenoid are actuated to stop pressurizing the second chamber and to retain the pressure in the second chamber when the piston reaches the intermediate position, and wherein the first solenoid and the second solenoid are actuated to release the pressure from the second chamber when the pneumatic circuit is deactivated.

12. The actuator assembly according to claim 8, wherein the pneumatic circuit comprises an activation switch configured to activate the pneumatic circuit to pressurize the second chamber of the cylinder and to deactivate the pneumatic circuit to release pressure from the second chamber.

13. The actuator assembly according to claim 12, wherein the activation switch is operatively connected to a rotary switch.

14. The actuator assembly according to claim 8, wherein the biasing element comprises a compression spring.

15. A method for exercising a trip valve of a pneumatic trip system for a turbine, wherein the trip valve comprises a valve member operatively associated with a turbine flow path and a valve stem connected to the valve member, and wherein the valve member is configured to be actuated to engage the turbine flow path to close the flow path and prevent fluid flow through the turbine flow path, the method comprising:

providing an actuator assembly operatively connected to the valve stem, the actuator assembly comprising:
a cylinder;
a piston movably disposed within the cylinder and dividing the cylinder into a first chamber and a second chamber;
a biasing element disposed in the second chamber of the cylinder, the biasing element engaging the piston;
a pneumatic circuit in communication with the second chamber of the cylinder; and
a pneumatic mechanism configured to pressurize the first chamber of the cylinder,
wherein the piston is operatively connected to the valve stem to move the valve stem and the valve member between an open position allowing fluid flow through the turbine flow path and a closed position preventing fluid flow through the turbine flow path,
wherein the biasing element engages the piston to bias the valve stem and the valve member toward the closed position,
wherein the cylinder includes a first port for placing the first chamber in communication with an exterior of the cylinder such that the first chamber of the cylinder can be pressurized to cause the piston to hold the valve stem and the valve member in the open position,
wherein the pneumatic mechanism is in communication with the first chamber of the cylinder via the first port, and
wherein the cylinder includes a second port for placing the second chamber in communication with the pneumatic circuit;

pressurizing the first chamber of the cylinder with the pneumatic mechanism to cause the piston to hold the valve stem and the valve member in the open position;

releasing the pressure from the first chamber of the cylinder with the pneumatic mechanism to allow the piston to move the valve stem and the valve member to the closed position under the bias of the biasing element;

activating the pneumatic circuit to pressurize the second chamber of the cylinder to actuate the piston to move the valve stem and the valve member to an exercised position between the open position and the closed position while the first chamber is pressurized by the pneumatic mechanism;

activating the pneumatic circuit to stop pressurizing the second chamber when the valve stem and the valve member reach the exercised position and retain pressure in the second chamber to hold the valve stem and the valve member in the exercised position; and deactivating the pneumatic circuit to release the pressure from the second chamber and allow the valve stem and the valve member to return to the open position, wherein the valve member allows fluid flow through the turbine flow path in the exercised position.

16. The method according to claim 15, wherein the pneumatic circuit comprises a limit switch actuated by the piston when the piston moves the valve stem and the valve member to the exercised position, and wherein the limit switch is configured to activate the pneumatic circuit to stop pressurizing the second chamber and to retain the pressure in the second chamber when actuated by the piston.

17. The method according to claim 15, wherein the pneumatic circuit comprises a first solenoid and a second solenoid, wherein the first solenoid and the second solenoid are actuated to pressurize the second chamber of the cylinder when the pneumatic circuit is activated, wherein the first solenoid and the second solenoid are actuated to stop pressurizing the second chamber and retain the pressure in the second chamber when the valve stem and the valve member are in the exercised position, and wherein the first solenoid and the second solenoid are actuated to release the pressure from the second chamber when the pneumatic circuit is deactivated.

18. The method according to claim 15, wherein the pneumatic circuit comprises an activation switch configured to activate the pneumatic circuit to pressurize the second chamber of the cylinder and to deactivate the pneumatic circuit to release the pressure from the second chamber.

* * * * *